United States Patent
Polzin et al.

[11] Patent Number: 5,416,907
[45] Date of Patent: May 16, 1995

[54] METHOD AND APPARATUS FOR TRANSFERRING DATA PROCESSING DATA TRANSFER SIZES

[75] Inventors: R. Stephen Polzin, Holden; James N. Leahy, Boston; Robert E. Willard, Andover, all of Mass.

[73] Assignee: Digital Equipment Corporation, Maynard, Mass.

[21] Appl. No.: 538,656

[22] Filed: Jun. 15, 1990

[51] Int. Cl.$^6$ .......................... G06F 3/00; G06F 7/30; G06F 15/06
[52] U.S. Cl. ................................... 395/275; 395/425; 395/250; 395/600
[58] Field of Search ............... 395/275, 250, 425, 500, 395/725, 375, 575, 600

[56] References Cited

U.S. PATENT DOCUMENTS

| | | | |
|---|---|---|---|
| 3,432,813 | 3/1969 | Annunziata | 395/275 |
| 4,347,567 | 8/1982 | DeTar | 395/425 |
| 4,396,995 | 8/1983 | Grau | 395/575 |
| 4,447,877 | 5/1984 | Grodalski | . |
| 4,570,220 | 2/1986 | Tetrick et al. | . |
| 4,683,534 | 7/1987 | Tietjen | 395/375 |
| 4,724,518 | 2/1988 | Steps | 395/425 |
| 4,750,154 | 6/1988 | Lefsky | 365/189.04 |
| 4,805,098 | 2/1989 | Mills | 395/250 |
| 4,827,400 | 5/1989 | Dunwell et al. | . |
| 4,831,514 | 5/1989 | Turlakov | 395/500 |
| 4,841,435 | 6/1989 | Papenberg | . |
| 4,875,206 | 10/1989 | Nickols et al. | . |
| 4,878,166 | 10/1989 | Johnson et al. | . |
| 5,038,277 | 8/1991 | Altman | 395/250 |
| 5,073,969 | 12/1991 | Shoemaker | 395/725 |

*Primary Examiner*—Thomas G. Black
*Assistant Examiner*—Jean R. Homere
*Attorney, Agent, or Firm*—Denis G. Maloney; Arthur W. Fisher

[57] ABSTRACT

A method and apparatus for optimizing the performance of a multibus data processing system is provided. An I/O controller is coupled to the I/O bus and includes MORE bit setting means for initiating a MORE stream transaction on the I/O bus and for thereafter terminating the MORE stream transaction. An adapter coupling the I/O bus to the system bus, is configured to receive the MORE stream transaction and transfer it to main memory. The adapter includes MORE bit decoding means for identifying the beginning and the end of the MORE stream transaction, and for identifying whether the MORE stream transaction is a READ or WRITE transaction. The adapter also includes a first buffer for receiving data from the I/O bus and transferring the data to the memory in accordance with the memory's full block transfer size, and a second buffer for receiving a full block of data and transferring that data in accordance with the I/O bus transaction limitations. The adapter is capable of invalidating data located in the first buffer and clearing data located in the second buffer in accordance with a discard transaction when the I/O controller fails to properly terminate the MORE stream transaction.

15 Claims, 8 Drawing Sheets

METHOD AND APPARATUS FOR TRANSFERRING DATA PROCESSING DATA TRANSFER SIZES

FIELD OF THE INVENTION

This invention relates generally to data processing systems employing multiple buses and, more specifically, to a method and apparatus for optimizing the performance of a main memory unit of a data processing system by reducing the number of memory cycles required for the transfer of data to and from input/output (I/O) devices.

BACKGROUND OF THE INVENTION

In data processing systems, a bus is commonly employed to interconnect various elements of the system. For example, a central processing unit (CPU) is typically connected to a memory unit (main memory) and input/output (I/O) devices via a bus capable of carrying the signals associated with the operation of each element. These signals include address and data signals, clock signals, and various control signals. The bus will ordinarily be capable of carrying such signals to all elements coupled to the bus so that the data processed by the system can be transferred among the various elements of the system.

As data processing systems achieve increasingly higher levels of performance, it is sometimes desirable to provide more than one bus in the system. For example, it may be desired to provide a high speed main system bus which interconnects multiple CPUs to a main memory, and to provide a separate I/O bus which interconnects the system bus with I/O devices such as disk drives, tape drives and network controllers.

To transfer signals between the separate buses in a multibus data processing system, the buses must be suitably interconnected. In general this requires a bus adapter that is connected to both buses and operates on each according to the characteristics of that bus. Specifically, when data is to be transferred from one device to another device on a bus, a transaction is initiated on that bus according to a predetermined set of rules, commonly called a protocol, which is specific to that bus. A transaction is generally defined as a complete logical task performed on a bus, involving one or more transfers of data.

The internal organization of the main memory is important to the performance of the multibus data processing system. The internal data path of the memory is typically designed to be consistent with the amount of data that can be transferred to and from a CPU in a single bus cycle, i.e. the width of the data path of the system bus. This amount, termed a block, is as large as feasible so as to maximize the overall efficiency of the data processing system by reducing the number of system bus and memory cycles needed to transfer data to and from main memory.

Although I/O devices typically transfer large amounts of data to and from main memory, the architecture of the I/O bus may limit the size of I/O data transfers to something less than the block transfer size of the memory and system bus. Therefore, the transfer of data between the I/O devices and main memory may be a factor that limits overall data processing system throughput and efficiency.

Previously, an adapter connected to the I/O bus on which a transaction is initiated would receive the data from the I/O bus, place the data into its internal buffer and then obtain control of the system bus by issuing a request signal on the system bus. The adapter would then gain control of the system bus in response to a grant signal and begin to generate the signals which constitute a write data operation on the system bus, the operation including the transfer of the data resident in the adapter's buffer.

If the transaction size of the data on the I/O bus is less than a main memory block, the adapter's write operation to main memory will result in an increase in the number of memory cycles required to transfer data into the memory. For example, a write operation to main memory of less than a block of data will result in a read-modify-write operation to modify the desired data and calculate the proper ECC code. That is, an entire block of data will be read from the memory's array, a selected portion of that data block will be modified, and then the full block will be written back to the memory location. Such an operation decreases the memory bandwidth, that is, it increases the time required per unit of data transferred into the main memory.

U.S. Pat. No. 4,878,166, issued Oct. 31, 1989 to Johnson et al. describes a method and apparatus for transferring data between a first bus or Local Bus, to which a first set of high performance devices is attached, and a second bus or Remote Bus, to which a second set of relatively lower performance devices is attached. The apparatus described therein includes transfer means coupled to pack/funneling means, such that all data to and from the transfer means and either an I/O port or DMA channel must pass through the packing/funneling means.

For data returned to the Local Bus (read operation), the data is "right adjusted" and "packed" by the packing/funneling means into a 32 bit word since all transfers on the Local Bus are 32 bits wide, while for data sent to the Remote Bus (write operation), the packing-/funneling means "funnels" copies of the data bits juxtaposed in one word to the Remote Bus.

Therefore, in accordance with an aspect of the present invention, an object is to provide a new and improved method and apparatus for optimizing data transfers to and from I/O devices and main memory.

Additionally, an object of the present invention is to maximize system bus and memory bandwidth in a multibus data processing system.

SUMMARY OF THE INVENTION

The foregoing and other features of the invention are accomplished by providing a method and apparatus for optimizing main memory performance by reducing the number of memory cycles required for the transfer of data to and from I/O devices. The main memory is configured to receive and transmit data according to a defined data transfer size, i.e. a full block. However, the data transfer size on an I/O bus is smaller than a full block. In order to optimize the bandwidth of the memory and allow the data processing system to perform efficiently, the present invention provides a means for transferring data between the I/O device and main memory in accordance with the memory's full block design.

In general, an I/O controller transfers data between an I/O device and an adapter via the I/O bus. The adapter is also connected to the system bus and thus can transfer data between the I/O bus and main memory via the system bus. When the amount of data to be transferred to or from the memory is larger than the data transfer size on the I/O bus, the I/O controller sets a bit, called a MORE bit, in a command cycle transfer on the I/O bus to inform the adapter that a transaction consisting of more than one data transfer from the I/O controller is to be expected. This transaction, called a MORE stream transaction, may be implemented for either read or write operations.

The adapter, in response to receiving an asserted MORE bit as part of a WRITE transaction, allocates a buffer to temporarily store incoming data from the I/O bus during the series of I/O controller transfers. The buffer is configured to hold a full block of memory data. The I/O controller sets the MORE bit in the command cycle transfer for each subsequent data transfer within the MORE stream transaction if more data is required to complete the transaction. As the data is received by the adapter, it is loaded into the buffer until the buffer becomes full. At that time, the adapter transfers an entire full block to main memory. When the I/O controller reaches the last data transfer in of the transaction, it clears the MORE bit, thereby properly terminating the MORE stream.

Likewise the adapter, in response to receiving an asserted MORE bit as part of a READ transaction, allocates a buffer to store a full block of data from main memory. Again, the I/O controller sets the MORE bit in the command cycle transfer for each subsequent data transfer within the MORE stream transaction if more data is required to complete the transaction. The adapter then transfers portions of the full block to the I/O controller until the I/O controller clears the MORE bit.

The principle advantage-of this arrangement is an increase in the efficiency of data transfer in the data processing system since the number of system bus and memory cycles required for the transfer of data between an I/O controller and main memory is minimized.

Other objects, features and advantages of the invention will become apparent from a reading of the specification which, when taken in conjunction with the drawings, in which like reference numerals refer to like elements in the several views describes the invention, limited only by the claims.

DETAILED DESCRIPTION OF ILLUSTRATIVE EMBODIMENTS

Figure 1:
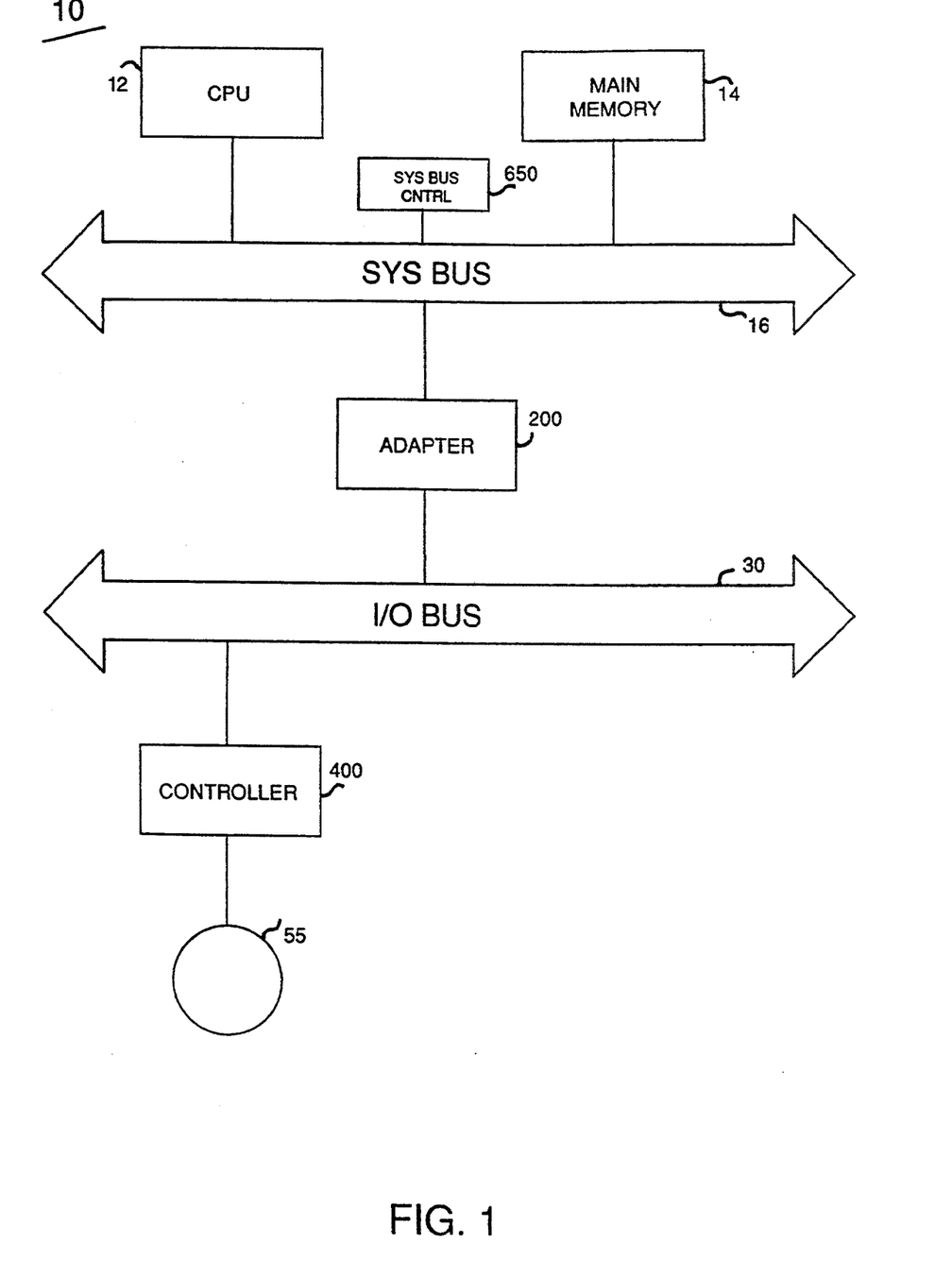
FIG. 1 is a block diagram of a typical application of the MORE stream apparatus in accordance with the invention.

Referring to the drawings and particularly to FIG. 1, data processing system 10 includes a central processing unit (CPU) 12, a memory unit (main memory) 14 and a system bus controller 650 interconnected by a high-speed memory system bus (system bus) 16. An input-/output (I/O) controller 400 is coupled to an I/O bus 30, the controller 400 being configured for operation with an I/O device 55 such as a disk drive. Also shown is an adapter 200 that interconnects the I/O bus 30 and the system bus 16. It is to be understood that multiple CPUs could be employed in a multiprocessing implementation of the invention, as could numerous other variant designs that will readily occur to the reader and which can be used within the scope of the invention.

In accordance with the principles of the present invention, the controller 400 and adapter 200 incorporate the circuitry required to implement transactions on I/O bus 30 that fully utilize the bandwidth of main memory 14. In other words, I/O controller 400 initiates transactions, hereinafter termed MORE stream transactions, on I/O bus 30, which are received by adapter 200. Adapter 200 then generates full block data transfers with main memory 14, thus utilizing the entire bandwidth of both the memory 14 and system bus 16.

In the nomenclature used to describe the present invention, CPU 12, memory 14, adapter 200, and I/O controller 400 are all called "nodes" on the respective buses. A node is defined as a hardware device which is connected to a bus. A bus is defined as a communications device medium that carries signals associated with the transfer of data between the nodes. An adapter is a dual node that interconnects two buses, i.e. it is a node on each of the buses. A controller is a node that connects an I/O device, such as a magnetic tape or disk drive, to a bus. The terms "signal" and "line" are used interchangeably to refer to physical wires described herein, while "lines" may also mean lines in a drawing.

In a typical embodiment of the invention, the I/O bus 30 is a 64-bit bus having a cycle time of 64 ns. The protocol for initiating transactions on I/O bus 30 is described more completely in U.S. patent application (N.O.A) Ser. No. 07/044,952, titled METHOD AND APPARATUS FOR ASSURING ADEQUATE ACCESS TO SYSTEM RESOURCES, filed May 1, 1987 by Richard B. Gillette, Jr. and Douglas D. Williams, and assigned to the assignee of this invention. The disclosure of the aforementioned application (and patent) is hereby expressly incorporated herein by reference as though fully set forth herein.

Nodes perform transfers with other nodes over system bus 16 and I/O bus 30. A transfer is one or more contiguous cycles that share a common transmitter node and common arbitration. For example, a READ operation initiated by one node to obtain information from another node on I/O bus 30 requires a command transfer from the first node to the second node followed by one or more transfers to return or send the requested data from the second node to the first node.

A transaction is defined as a complete logical task being performed on a bus and can include more than one transfer. For example, a READ operation consisting of a command transfer followed later by one or more return data transfers is one transaction. A transaction may also be initiated from a node on one bus to a node on another bus by way of an adapter linking the two buses.

In the preferred embodiment of the I/O bus 30, the permissible transactions support the transfer of different data lengths and include READ and WRITE (masked) operations. The various data lengths supported on I/O bus 30 include 4-byte longwords (LW), 8-byte quadwords (QW), 16-byte octawords (OW), and 36-byte hexawords (HW). A WRITE-MASKED operation utilizes a mask which indicates the bytes that are to be written. For example, if there are 4 bytes carried in parallel on the I/O bus 30 and 4 data cycles in a maximum-size WRITE-MASKED transaction on the I/O bus 30, the mask in the command cycle transfer indicates which bytes in this transaction are to be written.

The I/O bus 30 is preferably a "pended" bus. That is, after one node initiates a transaction, other nodes can have access to the bus before the first transaction is complete. Thus, the node initiating that transaction does not tie up the bus for the entire transaction time. This contrasts with a non-pended bus in which the bus is tied up for the entire transaction. For example, after a node initiates a READ transaction on I/O bus 30 and makes a command transfer, the node to which that command transfer is directed may not be able to return the requested data immediately. Cycles on bus 30 are then be available between the command transfer and the return data transfer of the READ transaction. I/O bus 30 allows other nodes to use those cycles.

Each of the nodes on I/O bus 30 can assume different roles in order to effect the transfer of information. One of those roles is as a "commander" which is defined as a node which has initiated a transaction currently in progress. For example, in a WRITE or READ operation, the commander is the node that requested the WRITE or READ operation; it is not necessarily the node that sends or receives the data. In the preferred protocol for I/O bus 30, a node remains the commander throughout an entire transaction even though another node may take control of the bus 30 during certain cycles of the transaction. For example, although one node has control of I/O bus 30 during the transfer of data in response to the command transfer of a READ transaction, that node, which is termed a "responder", does not become the commander of the bus.

Transmitters and receivers are roles which the nodes assume in an individual transfer. A "transmitter" is as a node which is the source of information placed on I/O bus 30 during a transfer. A "receiver" is the node which receives the information placed on bus 30 during a transfer. During a READ transaction, for example, a commander is a transmitter during the command transfer and then a receiver during the return data transfer.

When a node connected to I/O bus 30 is to become a transmitter on bus 30, that node asserts one of two request lines, CMD REQ (commander request) and RES REQ (responder request). These lines are arbitration signals used in determining which node is to have access to the data lines on the bus. The arbitration protocol for nodes connected to I/O bus 30 is described more completely in U.S. patent application Ser. No. 07/044,470, titled APPARATUS AND METHOD FOR DETERMINING ACCESS TO A BUS, filed May 1, 1987 by Darrel D. Donaldson and Richard B. Gillett, Jr., and assigned to the assignee of this invention. The disclosure of the aforementioned application is hereby expressly incorporated herein by reference as though fully set forth herein.

The essential function of the adapter 200 is to permit nodes, such as controller 400, attached to I/O bus 30 to initiate transactions to transfer data to or from nodes, such as main memory 14, attached to system bus 16 and to permit nodes connected to system bus 16 to initiate transactions to transfer data to or from nodes attached to I/O bus 30. In each case, a transaction initiated from a node on one bus to transfer data to or from a node on another bus is instituted in exactly the same way as all other transactions on the initiating bus, using the appropriate bus protocol.

If controller 400 attached to I/O bus 30 is to read data stored in main memory 14 attached to system bus 16, the controller 400 initiates a READ transaction on I/O bus 30 consisting of a single command/address cycle which is transferred from I/O bus 30 through adapter 200 to system bus 16 for delivery to the main memory 14. Likewise, if controller 400 is to write data to main memory 14, the controller 400 initiates a WRITE-MASKED transaction consisting of a single command/address cycle followed by the required write data. The information is thereafter transferred to system bus 16 by adapter 200.

Figure 2:
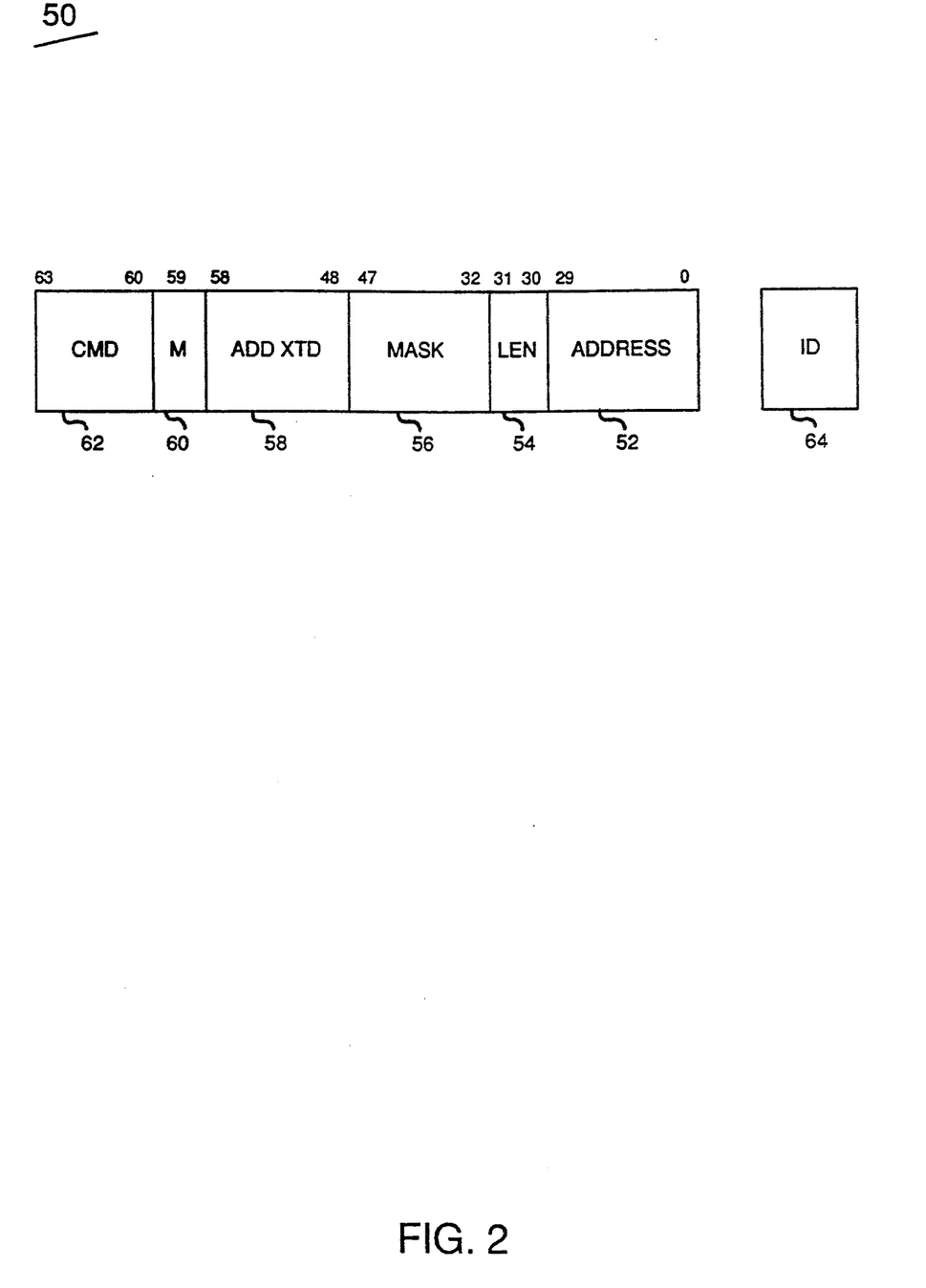
FIG. 2 is a block diagram representation of the format of a command cycle transfer on an I/O bus used in the MORE stream apparatus of FIG. 1.

FIG. 2 illustrates the control string 50 of a command cycle transfer used by commanders on I/O bus 30 to initiate transactions on that bus. Bits 0–29 are the address field 52 of a READ or WRITE transaction. Bits 30–31 are the length field 54 of an I/O bus 30 data transfer. Bits 32–47, the mask field 56, determine which bytes are to be written for a WRITE-MASKED transaction. Bits 48–58 are a field 58 reserved for future address extension, while bits 60–63 are the command field 62, containing a command initiated by the commander on the I/O bus 30. A separate unit, the node ID field 64 accompanies the control string 50. The field 64 identifies the node on the I/O bus 30 that initiated the transaction.

In accordance with the present invention, bit 59 in the string 50 is a MORE bit field 60. When the bit is set by I/O controller 400, it informs the adapter 200 that the controller 400 will be transferring data with main memory 14 in an amount that is larger than the maximum allowable transaction size on the I/O bus 30 and, as a result, multiple I/O bus 30 transactions will be required. In the specific I/O bus described herein, the maximum amount of data that can be transferred during one transaction on I/O bus 30 is 32 bytes.

As discussed previously, a problem addressed herein concerns attempts to optimize the performance of main memory by reducing the number of memory cycles required for the transfer of data to and from I/O nodes. The present invention overcomes the problem of the prior art by informing the adapter 200 that for a READ transaction initiated by I/O controller 400 (or any other node on the I/O bus 30) for a particular address in main memory 14, prefetched read data may be used in anticipation that another READ transaction initiated by controller 400 at the next consecutive address will follow the current READ transaction. Similarly, for a WRITE transaction initiated by I/O controller 400 on I/O bus 30 for a particular memory address, the write data from a number of bus 30 transfers may be consolidated by the adapter 200. Thus, actual writing of the data by adapter 200 in memory 14 is deferred if another WRITE transaction from the controller 400 to the next consecutive memory address will follow the current WRITE transaction. These consolidated transactions are termed "MORE stream transactions."

Figure 3:
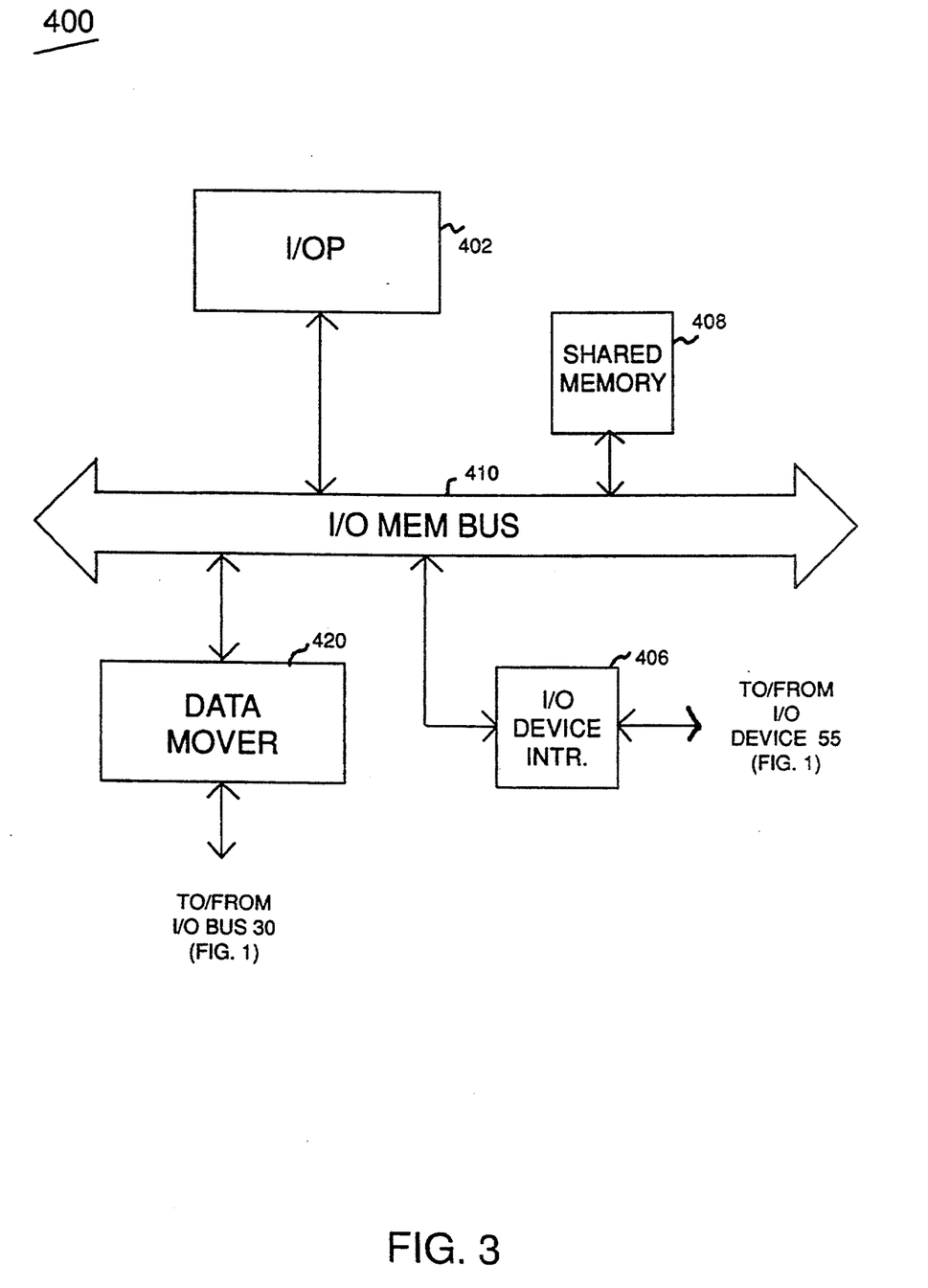
FIG. 3 is a block diagram of an I/O controller used in the MORE stream apparatus of FIG. 1.

FIG. 3 is a block diagram of the I/O controller 400 circuitry used to initiate MORE stream transactions. Controller 400 includes an I/O processor (I/OP) 402, an I/O device interface 406 and a shared memory unit 408 coupled to an I/O memory bus 410. A data mover 420 couples the I/O memory bus 410 to the I/O bus 30. The I/OP 402 handles the internal activities of controller 400 including communication with the I/O device interface 406 for the transfer of data to/from I/O devices 55, and communication with the data mover 420 for the transfer of data to/from I/O Bus 30. A more detailed description of the data mover 420 will be provided below in connection with FIG. 4. The I/O device interface 406 provides electrical connections to the various I/O devices 55 attached to controller 400. The shared memory unit 408 temporarily stores data that is either to be written to an I/O device 55 or that is read from an I/O device 55.

As an example of the internal operation of controller 400, if data from an I/O device 55 is to be written to main memory 14, the data is placed on I/O memory bus 410 via the I/O device interface 406 and then placed in shared memory 408. The I/O device interface 406 then issues control signals or "flags" to the I/OP 402 via the I/O memory bus 410. The flags notify the I/OP 402 that data is present in shared memory 408 and available for transfer to the main memory 14. The I/OP 402 then loads registers in the data mover 420 with information relating to the transfer. Some of these registers are described below in connection with FIG. 5.

Figure 4:
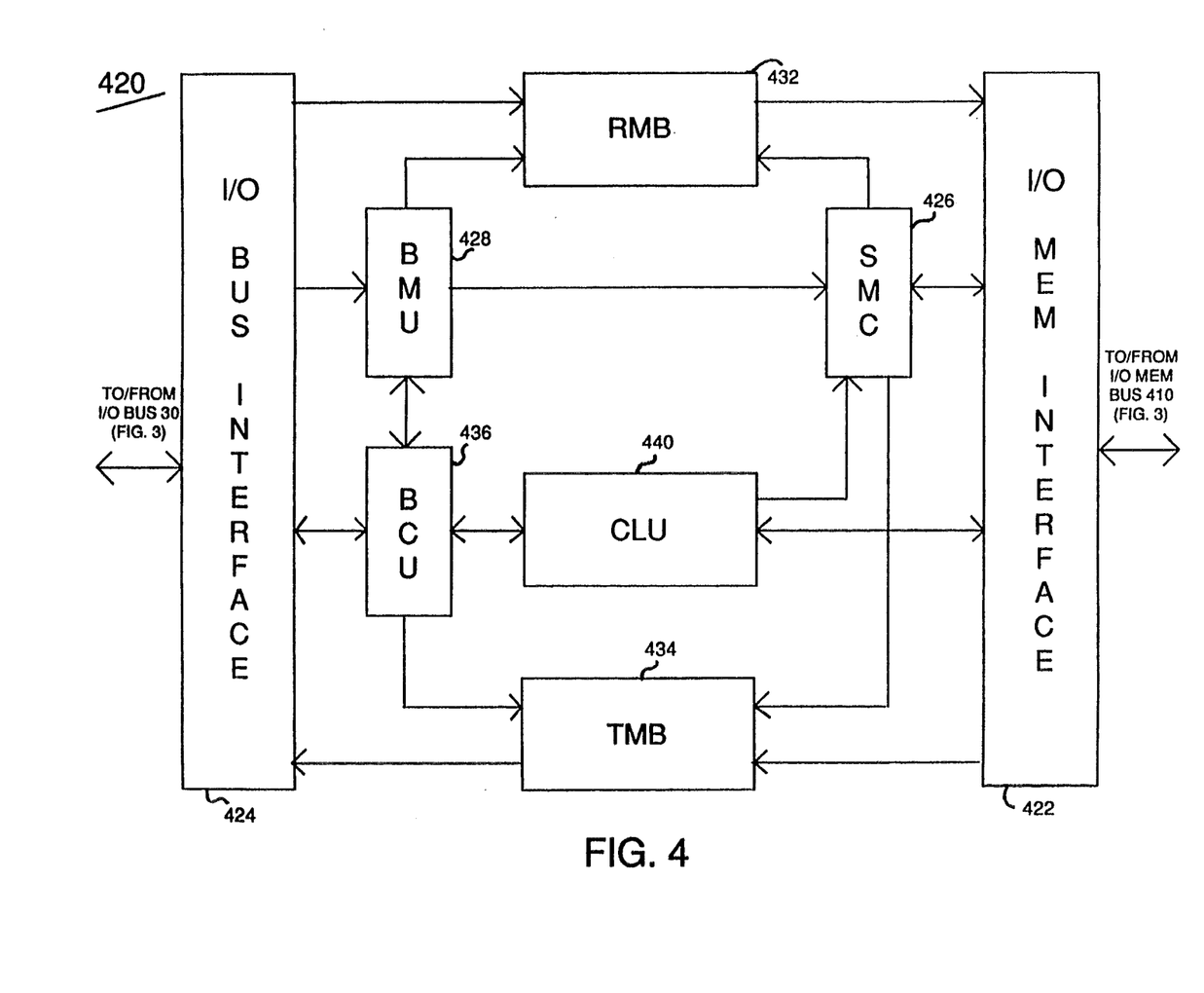
FIG. 4 is a block diagram of a data mover unit of the I/O controller of FIG. 3.

Refer next to FIG. 4, which is a block diagram of the data mover 420 of controller 400. The data mover 420 moves data between the I/O bus 30 and the shared memory 408 (FIG. 3). As such, data mover 420 includes an I/O memory interface unit 422 which contains the data path logic that connects a shared memory control (SMC) unit 426, a receive move buffer (RMB) 432, a transmit move buffer (TMB) 434, and a control logic unit (CLU) 440 to the I/O memory bus 410. The control unit 426, also coupled to buffer 432, logic unit 440 and buffer 434, is a state machine that controls data move operations to and from the shared memory 408 of controller 400 as further described herein.

The data mover 420 likewise operates on I/O bus 30 to transfer data with other nodes on I/O bus 30 and, in particular, with adapter 200 (FIG. 1) for transfers to and from main memory 14 on system bus 16. An I/O bus interface unit 424, coupled to an I/O bus monitor unit (BMU) 428, provides the physical and logical connection of the data mover 420, and thus the controller 400, to the I/O bus 30. The monitor unit 428, which is connected to buffer 432, control unit 426 and an I/O bus control unit (BCU) 436, is a state machine that monitors all I/O bus 30 activity and determines if the current I/O bus cycle is directed to controller 400. The monitor unit 428 also loads data into buffers within data mover 420.

The I/O bus interface unit 424, which is coupled to buffer 432, buffer 434 and bus control unit 436, has a counterpart unit in each node on the I/O bus 30. These units contain the data path logic and physical connections needed to ensure that the nodes on the I/O bus 30 meet the timing and electrical characteristics required to communicate on the bus. A suitable interface 424 is described in the following U.S. Patents: U.S. Pat. No. 4,774,422, titled HIGH SPEED LOW PIN COUNT BUS INTERFACE, issued Sept. 27, 1988 to Donaldson et al, and assigned to the assignee of this invention and U.S. Pat. No. 4,829,515, titled HIGH PERFORMANCE LOW PIN COUNT BUS INTERFACE, issued May 9, 1989 to Donaldson et al, and also assigned to the assignee of this invention. The disclosures of the aforementioned patents are hereby expressly incorporated herein by reference as though fully set forth herein.

With further reference to FIG. 4, the buffer 432 contains read data from a data move read operation. The buffer 434 contains write data for a data move write operation. A data move read operation is a read operation in the main memory 14 on system bus 16 followed by a transfer of the retrieved data to the shared memory 408 of controller 400. A data move write operation is a transfer of data to the main memory 14 from the shared memory 408.

The bus control unit 436 is the main control point, or "engine", of the data mover 420 It is coupled to I/O bus interface unit 424, monitor unit 428, logic unit 440 and buffer 434. The bus control unit 436 determines the order in which I/O controller 400 transactions occur on the I/O bus 30. It loads the proper addresses into the data move registers located in the logic unit 440 and loads the data from the buffer 434. The bus control unit 436 also signals the monitor unit 428 that read data is available.

Operationally, the bus control unit 436 and the control unit 426 communicate through the logic unit 440. A more detailed description of logic unit 440 and the data move registers contained therein is provided below in connection with FIG. 5. As will be described, a buffer ownership bit is contained in one of the data move registers in the logic unit 440. When set, the bit indicates that the bus control unit 436 "owns" control over the buffer 432 or buffer 434, depending upon whether the transaction is a data move read or a data move write operation. For example, if the transaction is a read operation, the bus control unit 436 initiates a READ transaction on the I/O bus 30 and signals the monitor unit 428 that data will be returned at a later time. When the data is returned, the monitor unit 428 loads it into the buffer 432 and clears the buffer ownership bit. A cleared (or not set) ownership bit signals the control unit 426 to take the data from the buffer 432 and transfer (write) it to the shared memory 408 on I/O memory bus 410 via the I/O memory interface unit 422. When the operation is finished, the control unit 426 again sets the ownership bit and the procedure is repeated until the logic unit 440 indicates that all the data read from main memory 14 has been transferred to shared memory 408.

Figure 5:
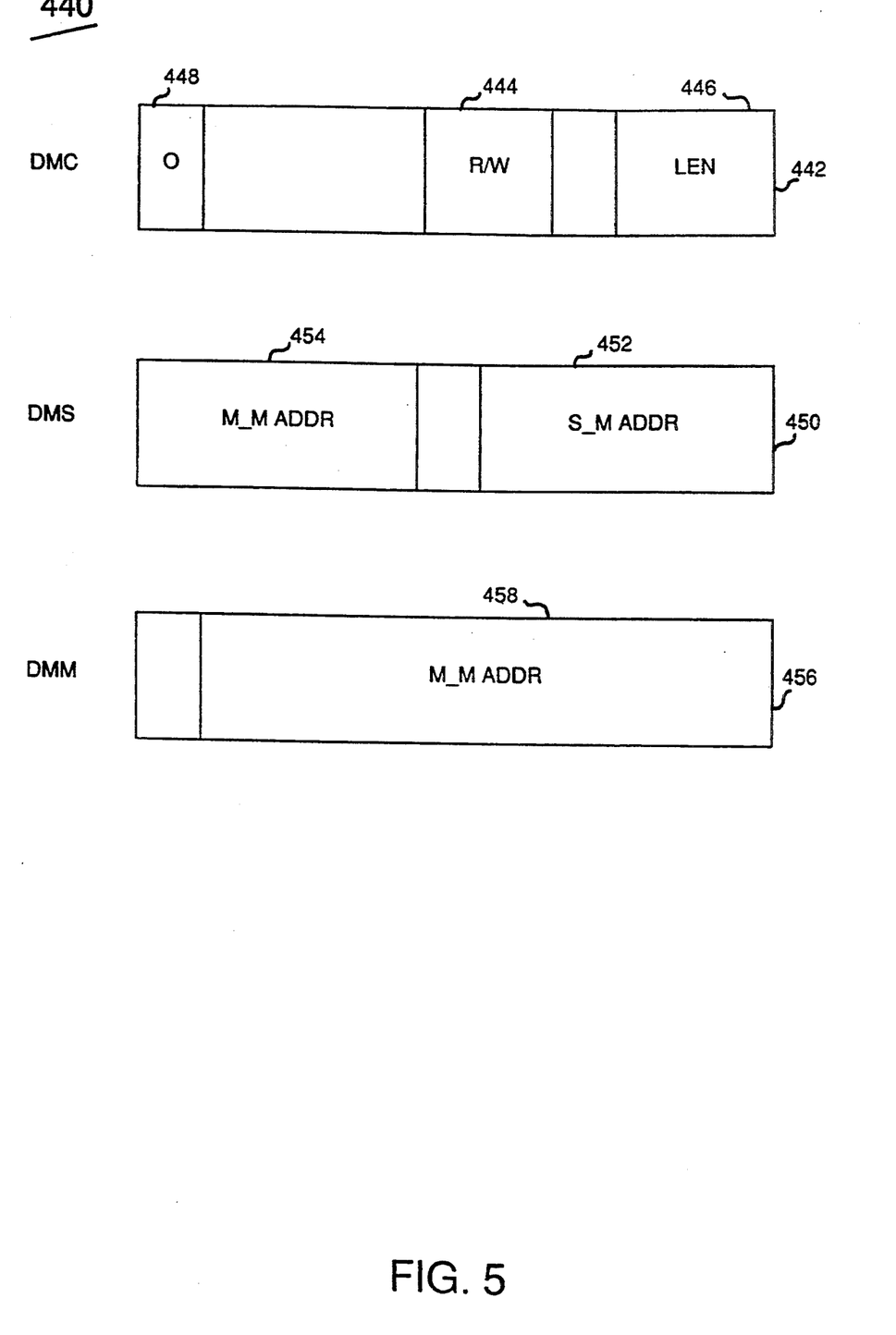
FIG. 5 is a block diagram illustrating the registers located in the control logic unit of the data mover of FIG. 4.

FIG. 5 illustrates the contents of the data move registers in logic unit 440. These registers determine the types of data move transactions that occur in the controller 400. A data move control and status (DMC) register 442 contains control and status information within fields such as a command field 444, a length field 446 and an ownership field 448. The command 444 field contains information which identifies the transaction (READ/WRITE) to be performed, while the contents of the length field 446 indicate the amount of the data associated with the transaction. The ownership field 448 contains a bit indicating the owner of the transaction. When the bit is set, the data mover 420 (i.e. the bus control unit 436) is the owner and acts upon the transaction. When the bit is not set, the I/OP 402 is the owner, indicating that it is still setting up the transaction.

The data move shared memory address (DMS) register 450 contains the addresses used in the transaction to be performed. Field 452 contains the shared memory address in shared memory 408 used in the transaction, while field 454 contains the lower 9 bits of the address location in main memory 14. The data move main memory (DMM) register 456 contains the higher order main memory address bits in field 458.

Continuing with the example of the operation of controller 400, and with reference to FIGS. 3, 4 and 5, the I/OP 402, while writing in the various fields of the data move registers, sets the ownership bit in field 448 of register 442, thus signaling to the bus control unit 436 and control unit 426 that a data move operation is about to take place. The command field 444 identifies the type of operation, which in this case is a data move write operation. The data in shared memory 408 is then transferred over the I/O memory bus 410 to the buffer 434 via the I/O memory interface unit 422.

Bus control unit 436 prepares the data mover 420 for a WRITE-MASKED transaction on the I/O bus 30 by loading, in conjunction with the logic unit registers 440 and the monitor unit 428, the proper address and control information into the appropriate registers and buffers in the I/O bus interface unit 424. The address and control information is arranged according to the command cycle transfer string 50 depicted in FIG. 2. Since the transaction is a WRITE transaction, the write data located in the buffer 434 is also presented to buffers in I/O bus interface 424.

In accordance with the teachings of the present invention, the logic unit 440 examines the amount or length of the write data to determine the number of WRITE-MASKED transactions on the I/O bus 30 needed to transfer all the write data into main memory 14. As mentioned, the maximum amount of write data that is transferred in one transaction on I/O bus 30 is 32 bytes. Therefore, the logic unit 440 calculates the number of bus 30 transactions needed to accomplish the write operation. If more than one transaction is necessary, the logic unit 440 signals the bus control unit 436 to set the MORE bit in field 60 of the control string 50 format of FIG. 2. The I/O bus interface unit 424 then arbitrates for access to the I/O bus 30 and, once awarded access, initiates a WRITE MORE stream transaction on the I/O bus 30.

A WRITE MORE stream transaction is a series of hexaword (HW) or octaword (OW) length WRITE-MASKED transactions, initiated by a controller 400 which has set the MORE bit in the control string 50. A single WRITE-MASKED transaction having the MORE bit cleared (or not set) signals the end of the WRITE MORE stream transaction.

Stated differently, WRITE MORE stream transactions are used by the I/O controllers 400 to transfer blocks of data from their internal buffers to buffers in the adapter 200 and then to main memory 14. A controller 400 signals to the adapter 200 that a WRITE MORE stream transaction is terminated by deasserting the MORE bit in the control string 50 of the last transaction in the WRITE MORE stream transaction. When the adapter 200 receives the last transaction with the MORE bit field 60 cleared, it transfers all data written to its buffer in the MORE stream transaction to the main memory 14 via the system bus 16.

A READ MORE stream transaction, on the other hand, is a series of HW or OW length READ transactions, initiated by an I/O controller 400 which sets the MORE bit in the control string 50 of a READ transaction on the I/O bus 30. READ MORE stream transactions are used by a controller 400 to transfer blocks of data from main memory 14 to buffers in the adapter 200 and then back to the controller 400. An I/O controller 400 signals to the adapter 200 that a READ MORE stream is terminated by deasserting the MORE bit field 60 in the control string 50 on the last transaction in the READ MORE stream transaction. When an adapter 200 receives the last transaction with the MORE bit cleared, the adapter 200 is required to mark any data retrieved from main memory 14 for the READ MORE stream transaction as invalid to avoid coherency problems, as will be further explained herein. The last transfer in the READ MORE stream transaction may be serviced by the adapter 200 from its buffer.

An advantage of the MORE stream circuitry and protocol is that the controller 400 need only set the MORE bit to initiate the MORE stream transaction and then clear the MORE bit to properly terminate the transaction. The circuit that interprets the MORE bit protocol is located in the adapter 200.

Another advantage of the invention is that use of the MORE protocol with HW lengths will require less system bus bandwidth, therefore increasing overall data processing system throughput.

Although a transaction must be completed prior to the initiation of another transaction, a WRITE MORE stream transaction, which is in effect a series of individual transactions on the I/O bus 30, may be interspersed with data written to memory 14 which is unrelated to a block transfer stream that is occurring from the same node. In this case, the adapter 200 will undertake the WRITE transactions in main memory 14 initiated by a particular I/O controller 400 in the order in which they are received by the adapter 200 from the I/O bus 30.

To summarize, WRITE transactions that are not part of a WRITE MORE stream transaction previously begun by the same controller 400 and that are issued before the termination of the WRITE MORE stream transaction may be undertaken in main memory 14 before the completion of the WRITE MORE stream transaction on the I/O bus 30.

For example, a first controller 400 may initiate a WRITE transaction to main memory 14 that exceeds the maximum transaction size operation on I/O bus 400. The first controller 400 thus sets the MORE bit field 60 in the control string 50 of the initial WRITE transaction; and the adapter 200, upon receiving the control string 50, sets up a first buffer to accumulate data from that transaction and from WRITE transactions that will follow within the overall WRITE MORE stream transaction. This operation is described further in connection with FIG. 7.

Subsequently, another WRITE transaction from a second controller 400 may be initiated on I/O bus 30, the subsequent WRITE transaction being a non-MORE stream transaction. The data involved in this subsequent WRITE transaction, upon being received by adapter 200, is placed into a second buffer. Adapter 200 conveys this subsequent WRITE transaction from the second controller 400 to memory 14 immediately, i.e. without waiting for completion of the WRITE MORE stream transaction on the I/O bus 30. The first controller's WRITE MORE stream transaction will be conveyed to memory 14 only after it has been completed on bus 30 or the first buffer is full. Therefore, the WRITE transactions have been reordered in the sense that they do not arrive at memory 14 in the order in which they were initiated on bus 30.

Figure 6:
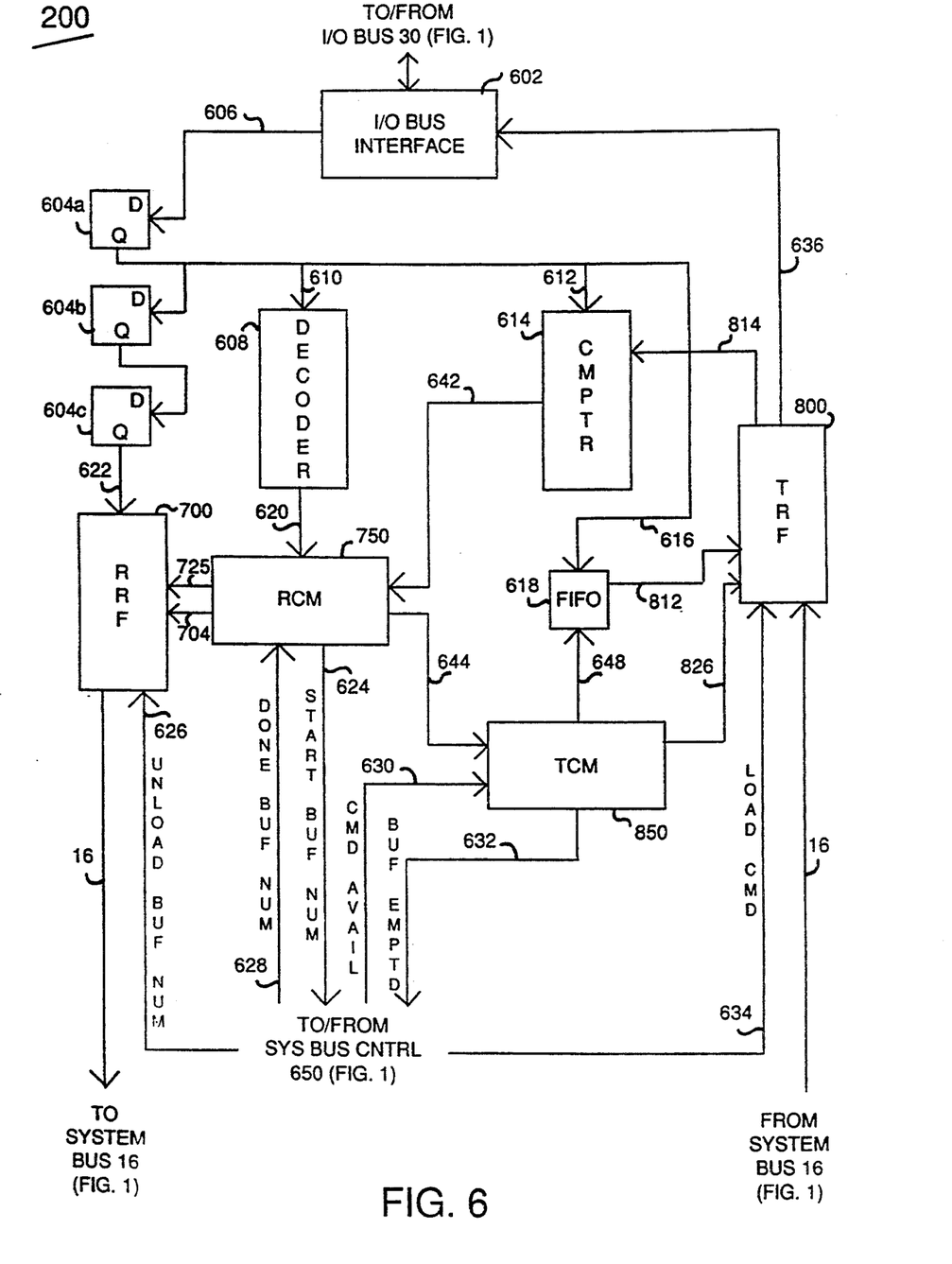
FIG. 6 is a block diagram of an adapter used in the MORE stream apparatus of FIG. 1.

Refer now to FIG. 6, which is a block diagram of an adapter 200 used in the MORE stream arrangement of the invention. Adapter 200 includes I/O bus interface logic 602 for receiving and transmitting transactions over bus 30. The I/O bus interface logic 602 is similar to the I/O bus interface unit 424 of controller 400 and, as such, contains the data path logic and physical interconnections needed to ensure that the adapter 200, when connected to the I/O bus 30, meets the timing and electrical characteristics required to communicate on the I/O bus 30.

When an I/O bus transaction is received by adapter 200, the transaction information is forwarded over line 606 to a group of three state devices, designated 604a, 604b and 604c. The state devices are used to provide delays so that the incoming I/O bus transaction can be presented over line 610 to a decoder 608 prior to further action being taken by the adapter 200. In a preferred embodiment of the invention, state devices 604a, 604b and 604c are D-type flip-flops configured such that the input line 606 is coupled to the data input of device 604a, the Q output of device 604a is tied to the data input of state device 604b, and the Q output of device 604b is coupled to the data input of device 604c. The Q output of device 604a is also tied to decoder 608 over line 610, comparator 614 over line 612 and storage buffer 618 over line 616. State devices 604a and 604c are enabled by a first sub-clock signal of the I/O bus clock (64 ns), while state device 604b is enabled by a second sub-clock signal, the first and second sub-clock signals being separated or staggered by an amount of time equal to one-half the frequency of the I/O bus clock (32 ns). The circuits used to generate the sub-clock signals is disclosed in U.S. Pat. Nos. 4,774,422 and 4,829,515 referenced above and expressly incorporated by reference herein.

While the I/O bus transaction information is being decoded by decoder 608, the information is also supplied to a comparator 614 over line 612, and a storage buffer 618 over line 616. The storage buffer 618, preferably configured as a first-in first-out (FIFO) buffer, stores various fields of the string 50, i.e the address field, node ID and length field, if the incoming transaction is a READ MORE stream transaction. For purposes described below, the comparator 614 compares various fields of the transaction information to comparable information in a transmit register file (TRF) 800 relating to data stored in the file 800 in response to a prior READ MORE stream transaction. The file 800 stores data and control information to be transmitted to I/O controller 400 on I/O bus 30 via I/O bus interface 602 over line 636.

The decoder 608 decodes appropriate fields of the incoming control string 50 to determine the type of transaction, READ or WRITE, whether the MORE bit is set, etc. and forwards this information to a receive control state machine (RCM) 750 over line 620. Meanwhile, the transaction information is presented to a receive register file (RRF) 700 over line 622 from the device 604c. The state machine 750 directs the file 700 over lines 704 and 725 to parse the various fields of the transaction information and place them in a buffer within the file 700. For a WRITE MORE stream transaction, the machine 750 provides information necessary to bind the control information to the associated data. A more detailed description of the structure and function of the file 700 during a WRITE MORE stream transaction will be provided below in connection with FIG. 7.

Once the control information is decoded and arranged in file 700, the machine 750 sends a signal START BUF NUM over line 624 to the system bus controller 650 (FIG. 1), indicating that an I/O bus transaction is ready to be sent to main memory 14. The system bus controller 650 responds with a UNLOAD BUF NUM signal over line 626 to the file 700 to initiate the transfer of the I/O bus transaction over system bus 16 to memory 14. Once the transfer is complete, the system bus controller 650 sends a DONE BUF NUM signal over line 628 to machine 750.

If the incoming I/O bus transaction was a READ MORE stream transaction, control information including a tag is forwarded to main memory 14. A tag includes information from the node ID field 64 and length field 54 of control string 50. The data retrieved from the memory 14 (return data) and its associated tag will be transferred at a later time to adapter 200. Specifically, the system bus controller 650 (FIG. 1) will load an available buffer in the TRF 800 with the return data and tag by sending a LOAD CMD signal over line 634 to the file 800. The bus controller 650 will also signal a transmit state machine 850 that return data is loaded into an available buffer in file 800 with a CMD AVAIL signal over line 630. The machine 850 in turn signals the FIFO 618 over line 648 that data having a certain tag has been returned by main memory 14. FIFO 618 then supplies additional transaction information (address of the data and tag) to the file 800 over line 812. Thereafter, the relevant data and transaction information in the file 800 are forwarded to I/O bus interface logic 602 over line 636 for transfer to I/O bus 30. Once the file 800 has transferred the entire contents of its buffer, the state machine 850 sends a BUF EMPTD signal over line 632 to the system bus controller 650 indicating that another buffer is available in file 800. A more detailed description of the structure of the file 800 will be provided below in connection with FIG. 8.

It is possible that an incoming READ MORE stream transaction received by adapter 200 may request data that is already contained in the file 800 as a result of a previous READ transaction. The comparator 614 compares the address and tag fields of the incoming READ MORE stream transaction with corresponding transaction information contained in the file 800. If there is a match, the comparator 614 signals the machine 750 by asserting a MATCH signal over line 642. The state machine 750 correspondingly signals the machine 850 by means of a READ MORE MATCH signal over line 644.

As a result, the incoming READ MORE stream request is not sent to main memory 14, but is serviced within the adapter 200 by the file 800. The data in the file 800 is linked to the incoming READ MORE stream transaction by the machine 850 over line 826 and forwarded from the file 800 to the I/O bus interface logic 602 for transfer to I/O controller 400 that requested the data. The requested data is thus returned to the I/O controller 400 sooner than if the transaction were sent to main memory 14o Also, activity both in memory 14 and on system bus 16 is reduced, thereby increasing the overall throughput of data processing system 10.

Figure 7:
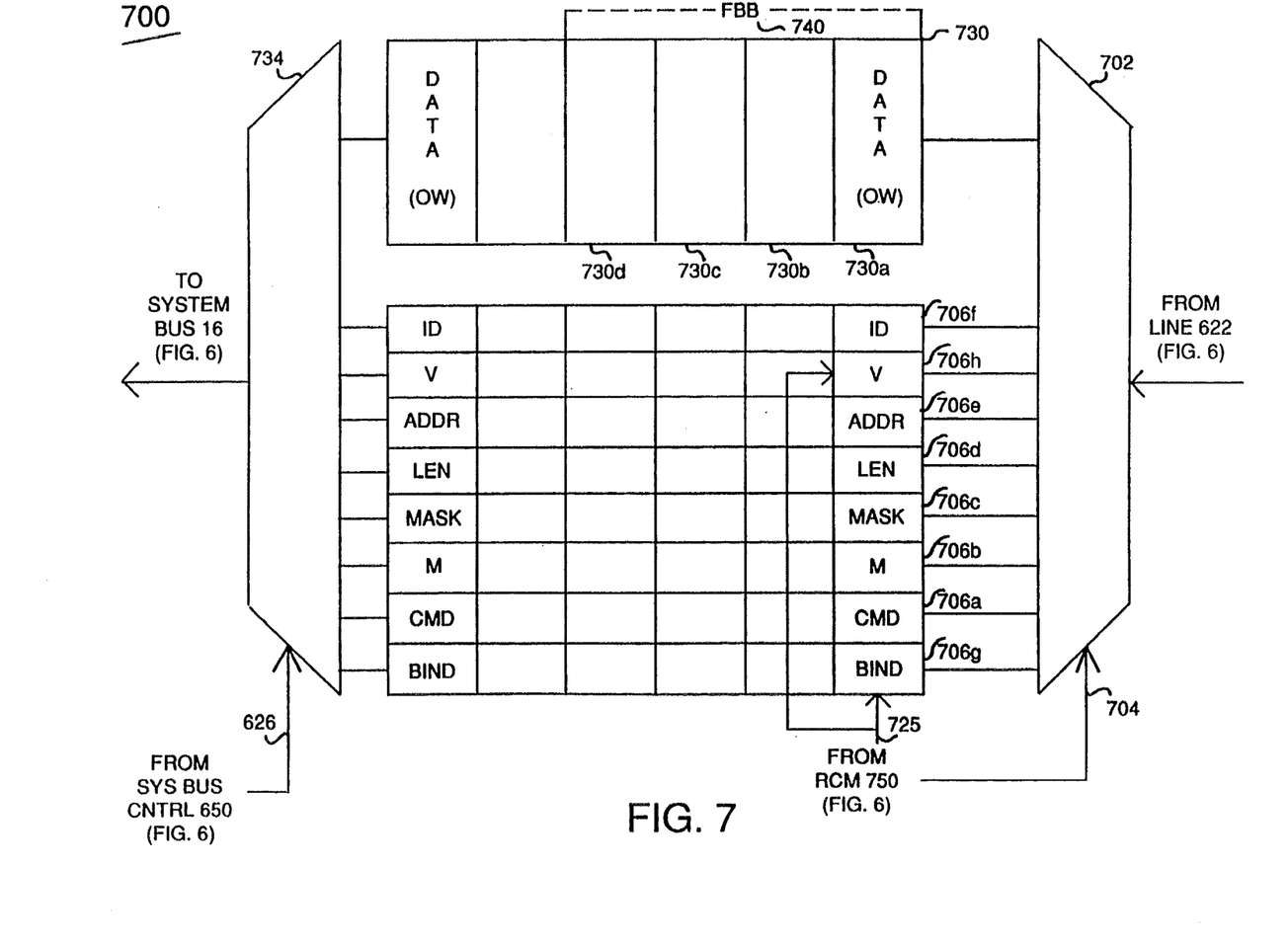
FIG. 7 is a block diagram of a Receive Register File located in the adapter of FIG. 6.

FIG. 7 is a block diagram of the Receive Register File (RRF) 700. An incoming MORE stream transaction, as received by the RRF 700 over line 622, is presented to a selector 702. The selector 702 is enabled by a LBUFNUM signal asserted by machine 750 over line 704. In response to the decoded information provided to the state machine 750 from the decoder 608, the machine 750 selects various fields of the control string 50 of the incoming MORE stream transaction and loads the contents of these fields into the appropriate sections of control buffer 706 in file 700. For example, the contents of the command field 62 of the control string 50 (FIG. 2) are loaded into a section 706a of control buffer 706. Likewise, the content of MORE bit field 60 is loaded into section 706b; the contents of mask field 56 are loaded into section 706c; the contents of the length field 54 are loaded into section 706d; the address in field 52 is loaded into section 706e; and the node ID in field 64 is loaded into section 706f.

The receive file 700 also has a plurality of data buffers, generally designated 730, for storing write data associated with WRITE MORE stream transactions. A bind field section 706g, in the file 700, identifies the starting buffer 730 location of the write data for the particular transaction described by the contents of buffer 706. The contents of section 706g are received from the state machine 750 over line 725. A validity bit field section 706h is also provided in the RRF 700. If set, the validity bit in this field indicates that the corresponding data in the write data buffers 730 have not yet been transferred to memory 14 and are still valid. The validity bit is also received from the machine 750 over line 725.

In a typical embodiment of the present invention, each of the write data buffers 730 contains sixteen bytes, or an octaword, of data, which is consistent with the write data transaction size on the I/O bus 30. However, the main memory 14 in the example is configured to receive 64-byte blocks of data, i.e. a full block. Therefore, for a WRITE MORE stream transaction, the file 700 allocates a set of four write data buffers e.g. 730a–730d for transfer to the main memory 14. The four write data buffers are designated as a write full block buffer (FBB) 740. It will be apparent to those skilled in the art that for a WRITE MORE STREAM transaction using hexaword transfers on I/O bus 30, a set of two write data buffers containing thirty-two bytes would be needed for a write FBB 740.

In accordance with the present invention, a write FBB 740 is loaded with WRITE MORE stream data only at a naturally aligned, 64-byte memory address boundary. In other words, for a write buffer 740 to be loaded with WRITE MORE stream data for delivery to main memory 14, the lowest six bits (bits <5:0>) of the corresponding memory address located in address field 714 must be zero. Otherwise, the data to be written to memory 14 is treated as a "widow" and sent to memory 14 as a normal, non-MORE stream WRITE transaction.

Once a write buffer 740 is loaded with write data and the machine 750 has asserted a START BUF NUM signal over line 624 to the system bus controller 650 (FIG. 1), the data in write buffer 740 and the corresponding fields of the RRF 700 are presented to selector 734. When the controller 650 asserts a subsequent UNLOAD BUF NUM signal over line 626 to select the contents of the various fields in RRF 700 while using the bind field 720 to locate the associated data in write FFB 740, the WRITE MORE stream transaction is then forwarded to the main memory 14 for servicing.

Figure 8:
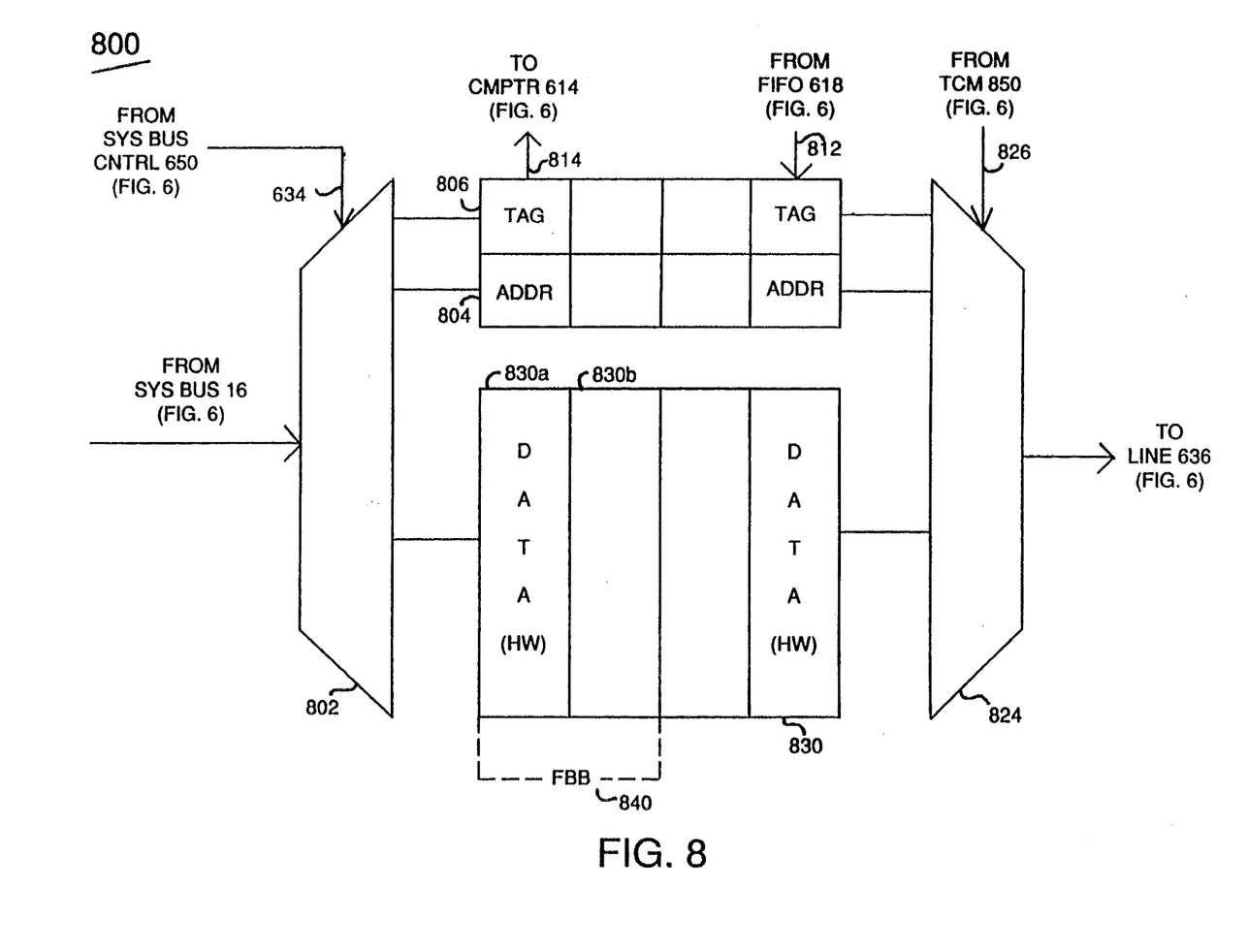
FIG. 8 is a block diagram of a Transmit Register File located in the adapter of FIG. 6.

Refer next to FIG. 8, which depicts the transmit register file (TRF) 800. In response to a READ command, the main memory 14 sends the retrieved data, together with a tag, to the file 800 over system bus 16 where the data is received by a selector 802. The system bus controller 650 asserts a LOAD CMD signal over line 634 to enable the selector 802 to load the data and tag into appropriate buffers. The tag returned by memory 14, which is equivalent to the ID field 64 (FIG. 2) that identifies the controller 400 that issued the READ MORE stream transaction, is loaded into one of a plurality of tag buffers generally designated 804. The related memory 14 address, which was previously loaded into file 800 by FIFO 618 over line 812 is contained in one of a plurality of address buffers generally designated 806. The return data is loaded into one of a plurality of read data buffers generally designated 830.

In the example described herein, each of the read data buffers 830 contains 32 bytes, or a hexaword, of read data, which is consistent with the read data transaction size limits on the I/O bus 30. However, as mentioned, the main memory 14 is configured to transmit 64-byte blocks of data, i.e. a full block. Therefore, for a READ MORE stream transaction using HW transfers on the I/O bus 30, the file 800 allocates a set of two read data buffers 830a,b, designated as a read full block buffer (FBB) 840, for the return read data. Of course, it will be apparent to those skilled in the art that for a READ MORE STREAM transaction using octaword transfers on I/O bus 30, a set of four OW length read data buffers would be needed for a read FBB 840. A least recently used (LRU) buffer allocation algorithm may be used to determine which read FBB 840 will be loaded.

The contents of the tag buffer 804, the address buffer 806 and the read buffer 840 are presented to a selector 824 for transmission to I/O controller 400. Specifically, the selector 824 is enabled by a TBUFNUM signal asserted by machine 850 over line 826 to forward the information to I/O bus interface logic 602 (FIG. 6) over line 636.

For READ MORE stream transactions initiated on the I/O bus 30, the adapter 200 actually performs prefetching with respect to the I/O bus 30, that is, in order to maximize the bandwidth and reduce the latency of main memory 14, the adapter 200 retrieves a full block of data from the memory 14 and then transmits it to the I/O bus 30 in smaller blocks. But prefetching of data raises a concern about stale data in the adapter's FBB 840. If the data in memory 14 is overwritten and the corresponding data in the FBB 840 was previously fetched by an I/O controller 400, the fetched data is obsolete. The READ MORE stream protocol however, solves this particular stale data problem.

The adapter 200 decodes the MORE bit field 60 each time it receives a READ transaction. If the MORE bit is set, the adapter 200 is guaranteed (in accordance with higher level software protocols) that more data is needed and it can prefetch the data. By requesting an extra data block from memory 14, some time is saved over waiting until the actual command arrives from the I/O bus 30. When an adapter 200 receives the last transfer of a READ MORE stream transaction with the MORE bit cleared, the adapter 200 is required to mark all prefetched data in the FBB 840 assigned to the READ MORE stream transaction as invalid. This aspect of the protocol avoids any coherency problems.

Another problem concerning stale data occurs when an I/O controller 400 encounters an exception condition, such as a power failure causing the controller 400 to improperly terminate a WRITE MORE or READ MORE stream transaction. In accordance with the present invention, a discard transfer is provided for this particular situation. The discard transfer directs the adapter 200 to invalidate a possibly active write FBB 740 in the file 700 and/or to clear data in the read FBB 840 in the file 800, thereby preventing subsequent reading of stale data.

In a preferred embodiment of the invention, a discard transfer is a quadword (QW) length WRITE-MASKED transaction to an innocuous address, for example address zero (0), having all bits in the mask field 56 of control string 50 clear and having the MORE bit set. Upon receipt of a discard transfer from an I/O controller 400, an adapter 200 discards any previously received data from an incomplete MORE stream transaction issued by the I/O controller 400. Stated differently, a discard transaction notifies the adapter 200 to invalidate data in a write FBB 740, thus inhibiting the writing of the contents of the FBB 740 to main memory 14. Alternately, a discard transaction clears the contents of the read FBB 840.

The foregoing description has been limited to a specific embodiment of this invention. It will be apparent, however, that variations and modifications may be made to the invention, with the attainment of some or all of its advantages. Therefore, it is the object of the appended claims to cover all such variations and modifications as come within the true spirit and scope of the invention.

What is claimed is:

1. Apparatus for optimizing the performance of a data processing system having an input/output (I/O) controller coupled to an I/O bus having a first data transfer size and configured to transfer data in accordance with data transactions initiated by said I/O controller, and a system bus having a second data transfer size coupled to a main memory and configured to transfer data in accordance with said data transactions, wherein said data transactions initiated by commands on said I/O bus use a control string, said control string containing a MORE bit which when set is used to indicate that the second data transfer size is larger than the first data transfer size, said apparatus comprising:

an adapter connected to said I/O bus and said system bus, and configured to receive said data from said I/O bus, decode said data transactions and transmit said data from said I/O bus to said main memory upon a determination by the adapter that a MORE bit is set, said adapter further being configured to receive data from said main memory in accordance with said data transactions and transmit said data received from said main memory to said I/O bus upon a determination by the adapter that said MORE bit is set.

2. The apparatus of claim 1 wherein said adapter is further configured to decode said MORE bit and allocate a first buffer to store said data having said first data transfer size when said MORE bit is set, and invalidate said first buffer when said MORE bit is cleared.

3. The apparatus of claim 2 wherein said adapter is further configured to decode said MORE bit and allocate a second buffer to store said data having said second data transfer size when said MORE bit is set, and clear said second buffer when said MORE bit is cleared.

4. Apparatus for optimizing the performance of a data processing system having an I/O bus configured to transfer data having a first data transfer size in accordance with data transactions initiated by an I/O controller, and a system bus coupled to a main memory configured to receive and transmit data having a second data transfer size, wherein said data transactions initiated by commands on said I/O bus use a control string, said control string containing a MORE bit which when set is used to indicate that the second data transfer size is larger than the first data transfer size, said apparatus comprising:

said I/O controller coupled between an I/O device and said I/O bus, and configured to transfer data between said I/O device and said I/O bus;

an adapter coupled between said I/O bus and said system bus, and configured to transfer data between said I/O bus and said main memory via said system bus;

means, located in said I/0 controller, for asserting a MORE bit when an amount of data transferred by said I/O controller is larger than said first data transfer size of said I/O bus;

means, located in said adapter, for determining whether said MORE bit has been asserted and for receiving data of said first data transfer size;

means, located in said adapter, for allocating a buffer to temporarily store data of said first data transfer size, said buffer configured to store data of said second data transfer size;

means, located in said adapter, for temporarily storing data of said first data transfer size until said buffer is full;

means, located in said adapter, for transmitting data to said main memory when said buffer is full; and means, located in said I/O controller for deasserting said MORE bit when said amount of data is transferred.

5. A method of optimizing the performance of a data processing system having an I/O controller coupled to an I/O bus configured to transfer data in accordance with data transactions initiated by said I/O controller, and a system bus coupled to a main memory configured to receive and transmit said data, said data processing system further including an adapter coupled between said system bus and said I/O bus, wherein said data transactions initiated by commands on said I/O bus use a control string, said control string containing a MORE bit which when set is used to indicate that the second data transfer size is larger than the first data transfer size, said method comprising:

setting said MORE bit in said data transactions at said I/O controller when said data has a second data transfer size;

transmitting said data having either a first data transfer size or a second data transfer size, and said MORE bit, from said I/O bus to said adapter;

decoding said data transactions including determining at said adapter whether said MORE bit has been set;

transmitting said data having said second data transfer size from said adapter to said main memory when said MORE bit is set; and clearing said MORE bit in said data transactions at said I/O controller when said data transactions are completed.

6. Apparatus for optimizing the performance of a data processing system having an input/output (I/O) bus having a first data transfer size and configured to transfer data in accordance with data transactions, and a system bus having a second data transfer size coupled to a main memory and configured to transfer data in accordance with said data transactions, wherein said data transactions initiated by commands on said I/O bus use a control string, said control string containing a MORE bit which when set is used to indicate that the second data transfer size is larger than the first data transfer size, said apparatus comprising:

an I/O controller coupled to said I/O bus and configured to transmit and receive said data, said I/O controller including means for setting said MORE bit when said data transactions are larger than said first data transfer size of said I/O bus and means for clearing said MORE bit when said data transactions are completed; and an adapter coupled between said I/O bus and said system bus, and configured to receive said data from said I/O bus and decode said data transactions and transmit said data having said second data transfer size to said main memory upon a determination by the adapter that said MORE bit is set, said adapter further configured to receive said data from said main memory and transmit said data to said I/O bus upon a determination by the adapter that said MORE bit is set.

7. The apparatus of claim 6 wherein said adapter is further configured to decode said MORE bit and allocate a first buffer to store said data having said first data transfer size when said MORE bit is set, and invalidate said first buffer when said MORE bit is cleared.

8. The apparatus of claim 7 wherein said adapter is further configured to decode said MORE bit and allocate a second buffer to store said data having said second data transfer size when said MORE bit is set, and clear said second buffer when said MORE bit is cleared.

9. Apparatus for optimizing the performance of a data processing system having an I/O bus configured to transfer data in accordance with data transactions, and a system bus coupled to a main memory configured to receive and transmit data in accordance with said data transactions, wherein said data transactions initiated by commands on said I/O bus use a control string, said control string containing a MORE bit which when set is used to indicate that the second data transfer size is larger than the first data transfer size, said apparatus comprising:

an I/O controller coupled to said I/O bus, said I/O controller including:
MORE bit setting means for initiating a MORE stream transaction on said I/O bus and for terminating said MORE stream transaction on said I/O bus;

an adapter coupled between said I/O bus and said system bus, said adapter configured to receive said MORE stream transaction on said I/O bus and transfer said data to said main memory in accordance with said MORE stream transaction, said adapter including:
MORE bit decoding means for identifying said MORE stream transaction and for identifying said terminating of said MORE stream transaction;
first buffering means for receiving data having a first data transfer size and transmitting data having a second data transfer size;
second buffering means for receiving data of said second data transfer size and transmitting data having said first data transfer size;
discard means for invalidating data located in said first buffering means and for clearing data located in said second buffering means when said I/O controller fails to terminate said MORE stream transaction after encountering an exception condition.

10. Apparatus for optimizing the performance of a data processing system having an input/output (I/O) bus having a first data transfer size and configured to transfer data in accordance with data transactions, and a system bus having a second data transfer size coupled to a main memory and configured to transfer data in accordance with said data transactions, wherein said data transactions initiated by commands on said I/0 bus use a control string, said control string containing a MORE bit which when set is used to indicate that the second data transfer size is larger than the first data transfer size, said apparatus comprising:

an I/O controller coupled to said I/O bus and configured to transmit data having said first data transfer size, said I/0 controller including:
means for setting said MORE bit when said data transaction includes data having said second data transfer size; and
means for transmitting said data having said first data transfer size; and an adapter coupled between said I/O bus and said system bus, said adapter including:
means for receiving said data having said first data transfer size from said I/O bus and decoding said data transactions;
means for transmitting said data having said first data transfer size to said main memory upon a determination by the adapter that said MORE bit is not set; and
means for transmitting said data having said second data transfer size to said main memory upon a determination by the adapter that said MORE bit is set.

11. The apparatus of claim 10 wherein said means in said adapter for transmitting data having said first data transfer size further comprises:
means for storing said data having a first data transfer size upon a decoding determination by the adapter that said MORE bit is not set.

12. The apparatus of claim 11 wherein said means in said adapter for transmitting data having said second data transfer size further comprises:
means for storing said data having said second data transfer size upon a decoding determination by the adapter that said MORE bit is set.

13. Method for optimizing the performance of a data processing system having an input/output (I/O) controller coupled to an I/O bus having a first data transfer size and configured to transfer data in accordance with data transactions initiated by said I/O controller, and an adapter coupled to a main memory via a system bus having a second data transfer size and configured to transfer said data in accordance with said data transactions, wherein said data transactions initiated by commands on said I/0 bus use a control string, said control string containing a MORE bit which when set is used to indicate that the second data transfer size is larger than the first data transfer size, said method comprising the steps of:

transmitting data having said first data transfer size from said I/O controller to said I/O bus without setting said MORE bit contained within said data transactions;
setting said MORE bit at said I/O controller when said data has said second data transfer size and transmitting said data having said second data transfer size from said I/O controller to said I/O bus;

receiving said data having said first data transfer size at said adapter from said I/O bus in the order transmitted by said I/O controller;

decoding said data transactions by said adapter to determine whether said MORE bit is set or not set;

transmitting said data having said first data transfer size from said adapter to said main memory upon a determination by the adapter that said MORE bit is not set; and transmitting said data having said second data transfer size from said adapter to said main memory upon a determination by the adapter that said MORE bit is set.

14. The method as defined in claim 13 wherein the step of transmitting said data having said first data transfer size from said adapter further comprises the step of:

allocating a first buffer in said adapter to store said data having said first data transfer size upon a decoding determination by the adapter that said MORE bit is not set.

15. The method as defined in claim 14 wherein the step of transmitting said data having said second data transfer size from said adapter further comprises the step of:

allocating a second buffer in said adapter to store said data having said second data transfer size upon a decoding determination by the adapter that said MORE bit is set.

* * * * *